United States Patent [19]

Borowski

[11] Patent Number: 5,024,451
[45] Date of Patent: Jun. 18, 1991

[54] MULTI-POSITION LABYRINTH SEAL RING

[75] Inventor: Richard Borowski, Victor, N.Y.
[73] Assignee: Garlock Inc., New York, N.Y.
[21] Appl. No.: 548,699
[22] Filed: Jul. 5, 1990
[51] Int. Cl.⁵ .............................................. F16J 15/34
[52] U.S. Cl. ............................................ 277/53; 277/57
[58] Field of Search ...................... 277/53, 55, 56, 57

[56] References Cited

U.S. PATENT DOCUMENTS

| 924,897 | 6/1909 | Emmet | 277/53 |
| 2,018,372 | 10/1935 | Mason | 277/53 |
| 4,022,479 | 5/1977 | Orlowski | 277/53 |
| 4,114,902 | 9/1978 | Orlowski | 277/53 |
| 4,175,752 | 11/1979 | Orlowski | 277/53 |
| 4,466,620 | 8/1984 | Orlowski | 277/53 |
| 4,572,517 | 2/1986 | Rockwood et al. | 277/53 |
| 4,706,968 | 1/1987 | Orlowski | 277/53 |

Primary Examiner—William A. Cuchlinski, Jr.
Assistant Examiner—Daniel G. DePumpo
Attorney, Agent, or Firm—Richard W. Watson

[57] ABSTRACT

A labyrinth seal ring designed to function properly regardless of its rotational orientation relative to a horizontal shaft to be sealed. The novel seal ring bore is formed with a series of lands and grooves, with a plurality of axially extending drainage grooves cut across the axially inner lands to allow fluid to drain back into the associated housing interior. The pattern of the drainage grooves varies from land to land so that nowhere is there a direct flow path across more than two lands. The new ring will most likely be used in conjunction with a bearing isolator seal, but it may be used alone in some applications.

19 Claims, 3 Drawing Sheets

MULTI-POSITION LABYRINTH SEAL RING

FIELD OF THE INVENTION

The present invention relates to rotary shaft seals which prevent lubricants associated with shaft bearings from leaking externally of the bearing housing or bearing support. In particular, the present invention is directed to labyrinth seals or rings designed for such purposed and which function properly regardless of their installed position of axial rotation relative to a horizontal shaft to be sealed.

BACKGROUND OF THE INVENTION

Typical labyrinth type rotary shaft seals are shown in Rockwood, et al., U.S. Pat. No. 4,572,517 and U.S. Pat. Nos. 4,022,479, 4,114,902, 4,175,752, 4,706,968 and 4,466,620, all to Orlowski. In such typical labyrinth type seals, internal labyrinth type grooves are provided in a metal seal ring which is fixed to a bearing housing. These grooves are specifically contoured to create an hydraulic dam effect which acts to remove lubricants moving axially along the shaft and pass them back into the bearing housing through a single axially extending drainage groove or trough. Other such seal rings are known in the art.

While the prior art seals of this general type have been effective in their sealing function, a problem common to all of them is that the positioning of the drainage groove or trough is critical to proper seal operation. Thus, when such a seal is installed around a horizontal shaft, the drainage groove or trough must be oriented to be at or very close to the lowest possible position relative to the shaft and the bearings or else the seal will not function properly. In some situations, persons not aware of the importance of proper positioning, could readily install such seals in a non-functional position. Also, even where it is known that the rotary shaft must be in a horizontal position and that the drainage groove must be directly under the shaft, there exist many applications where the final position of the bearing housing or support, and thus that of the drainage groove, may not be known prior to installation of the seal. For example, motors may be installed on the floor, on a wall or even suspended from a ceiling.

Thus, there is a need for a labyrinth bearing seal for rotary shafts which can be installed without regard to its orientation in the bearing housing and yet which will function effectively whatever its rotational orientation with respect to a horizontal rotary shaft to be sealed.

SUMMARY OF THE INVENTION

In order to overcome these and other problems, a novel seal ring is formed with a series of radial lands and grooves in its internal bore and a series of axially extending drainage grooves cut through each of the axially inner lands to connect adjoining grooves. At least one axially outermost land has no axially extending grooves. It is thus a primary objective of the present invention to provide a labyrinth seal which is simply and economically produced and which effectively prevents lubricant leakage without regard to its particular rotational position or orientation around a horizontal shaft.

It is a further objective to provide such a labyrinth ring which may be used alone or in combination with other seals for rotary shafts. Such combinations are particularly advantageous when minimum total leadage and/or foreign particle exclusion are important factors.

Figure 1:
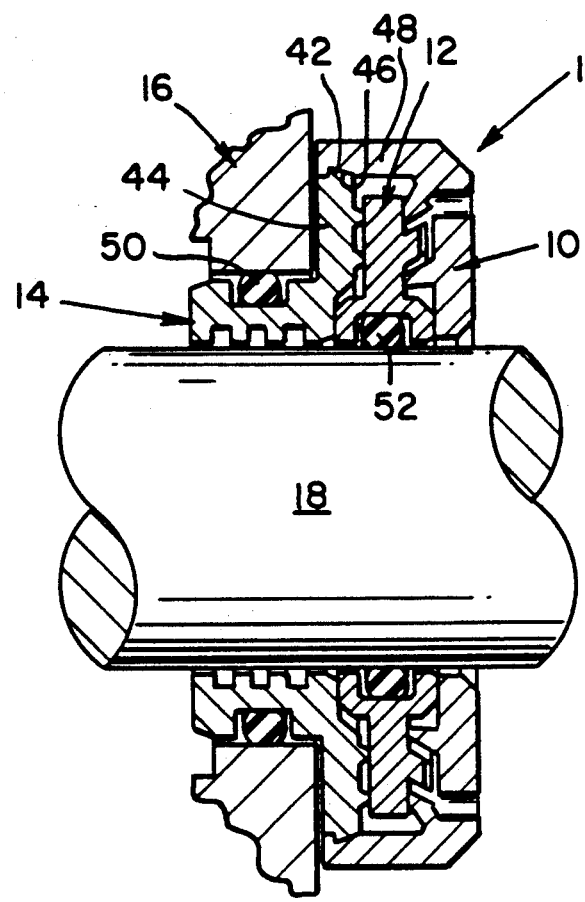
FIG. 1 is a vertical sectional view of a labyrinth ring according to the invention coupled with a bearing isolator seal, a machine housing and a rotary shaft.

FIG, 2 is a view similar to FIG. 1 except that the housing and shaft have been removed.

Figure 2:
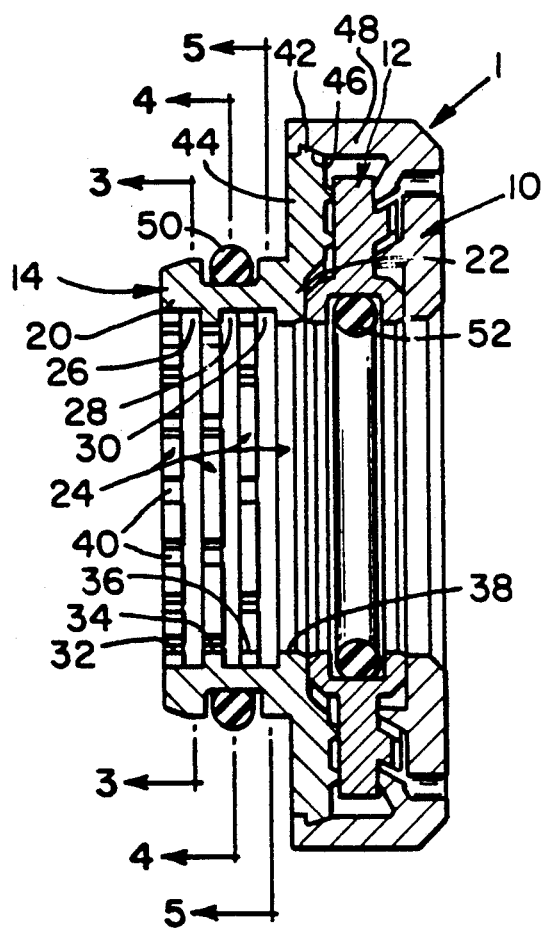
Figure 3:
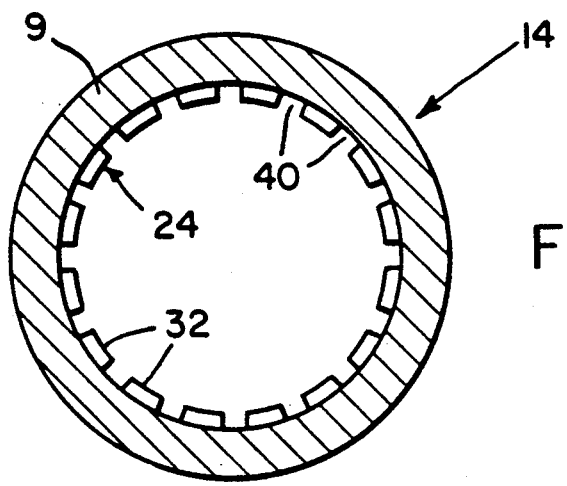

FIG. 3 is a vertical sectional view taken along line 3—3 of FIG. 2.

Figure 4:
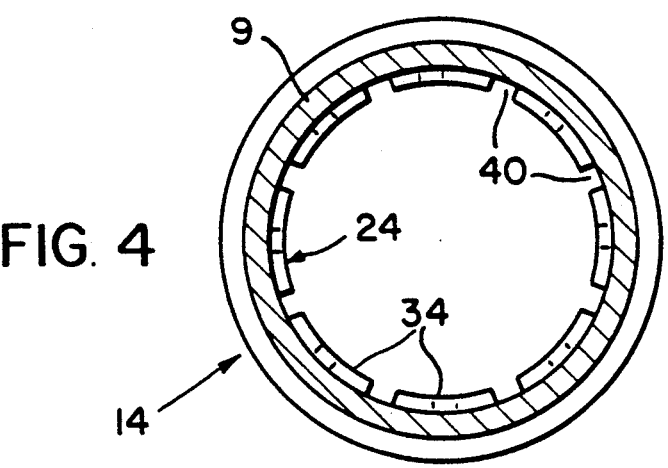

FIG. 4 is a vertical sectional view taken along line 4—4 of FIG. 2 except with one O-ring removed.

Figure 5:
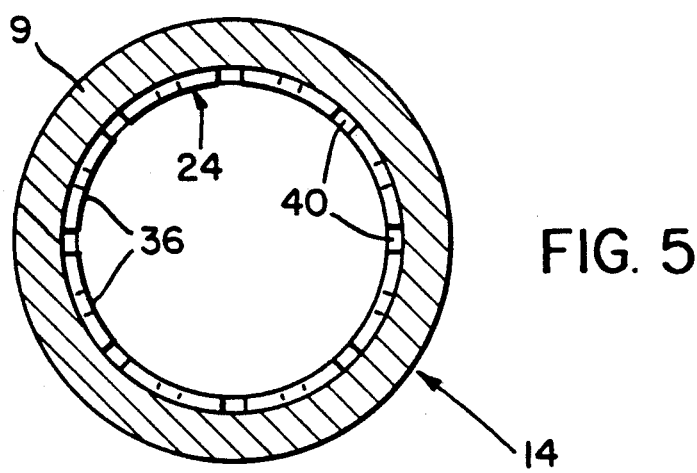

FIG. 5 is a vertical sectional view taken along line 5—5 of FIG. 2, also with the O-ring removed.

Figure 6:
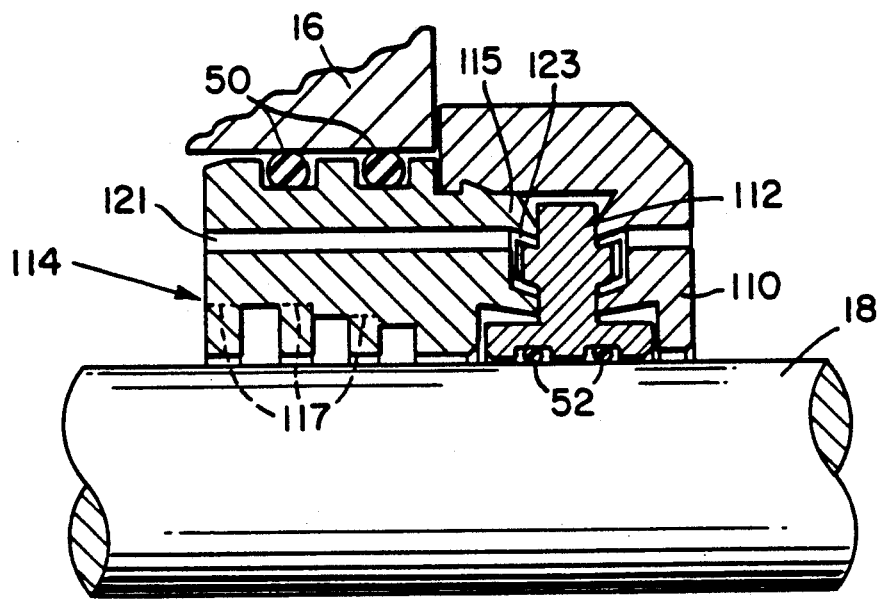

FIG. 6 is a vertical sectional view showing another embodiment of a labyrinth ring according to the invention and coupled with another bearing isolator seal.

Figure 7:
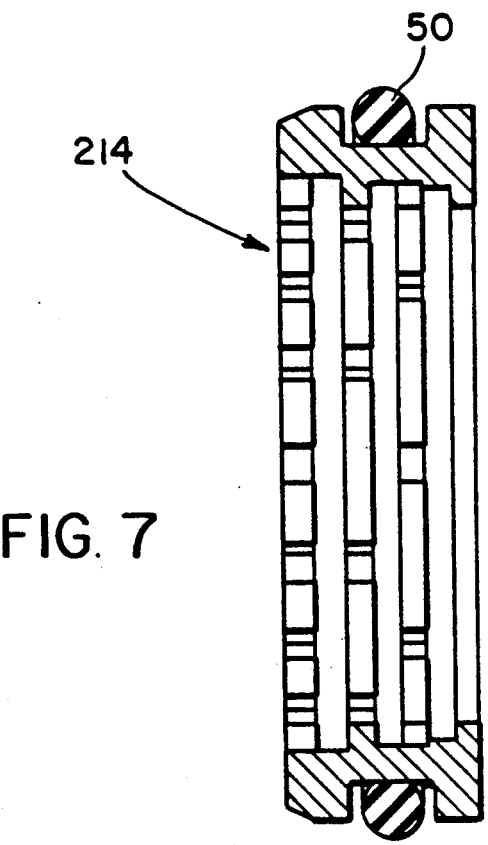

FIG. 7 is also a vertical sectional view showing yet another embodiment solus.

DETAILED DESCRIPTION OF THE INVENTION

FIGS. 1 and 2 show a seal assembly 1 with three primary components—a stator 10, a rotor 12 and a novel labyrinth ring 14. In FIG. 1, the seal assembly 1 is mounted with a housing 16 and a shaft 18 to prevent leakage of lubricant from the interior of housing 16 and to prevent ingress of foreign matter from the exterior (right) to the interior (left) of the housing 16. In FIG. 2, the same seal components are shown, but the housing 16 and shaft 18 have been removed so as to show more clearly the novel features of labyrinth ring 14.

Stator 10 and rotor 12 cooperate to provide a sealing action to prevent ingress of foreign matter from the exterior as fully described in U.S. Pat. No. 4,852,890 which is incorporated herein by reference.

Labyrinth ring 14 includes an axially inner end 20, an axially outer end 22, a bore 24 and a series of radial grooves 26, 28 and 30 cut or otherwise formed in the surface of bore 24. Thus, bore 24 becomes a series of radial lands 32, 34, 36 and 38. A plurality of axially extending drainage grooves 40 are formed across the inner peripheries of lands 32, 34 and 36, thus joining radial grooves 26, 28 and 30. Optimally, the radial clearance between shaft 18 and bore 24 (lands 32, 34, 36 and 38) is on the order of 0.010 to 0.015 inches. Preferably the depth of innermost radial groove 26 is greater than that of next outer groove 28 which, in turn, is preferably greater than that of next outer groove 30. Also, the depth of axial grooves 40 is preferably equal to that of the deeper of the radial grooves joined thereby, all to promote maximum fluid flow back toward the interior of the bearing housing. Outermost land 38 has no axially extending grooves.

In the embodiment shown in FIG. 1, stator 10, rotor 12 and labyrinth ring 14, which includes flange 44 as an integral part thereof, are held together as a unitary assembly by the interference fit of bead 42 at the radially outer end of flange 44 and groove 46 in the wall 48 of stator 10. However, instead of employing such a bead and groove connection, the entire seal unit may be held together by means of a metal shell, of which several are shown in the aforementioned U.S. Pat. No. 4,852,890. In either case, when the unit is installed, O-ring 50 is compressed between housing 16 and ring 14 to prevent relative rotation between the housing and the labyrinth ring and the stator. At the same time O-ring 52 is compressed between rotor 12 and shaft 18 to hold rotor 12 so that it rotates with shaft 18.

In operation, bearing lubricant tries to leak from housing 16 by moving outwardly between the surface of shaft 18 and bore 24 and then between stator 10 and rotor 12. Such leakage is largely retarded by the function of labyrinth ring 14. As lubricant tries to move axially outwardly along the shaft 18, centrifugal force tends to impel that lubricant from the shaft surface into radial grooves 26, 28 and 30. The lubricant then flows by gravity to the lowest portion of a radial groove and then drains through an axial groove or grooves 40 to the next axially inward radial groove until it reaches the interior of the housing.

As may be seen in FIG. 3, there are sixteen axial grooves 40 formed in innermost land 32 which will permit substantially complete drainage from groove 26 to the interior of the housing regardless of the rotational position of ring 14 and the rest of seal 1. By way of comparison, prior art labyrinth rings have had a single axial drainage groove or channel across the inner lands as previously described. FIG. 4 shows that there are eight axial grooves 40 formed in land 34 and that they are in the same rotational position as every other one of the grooves in land 32. Similarly, FIG. 5 shows that there are eight axial grooves in land 36 which offset equally from adjacent grooves in land 34.

The number of axial grooves 40 and the angular offset of these grooves from land to land is a matter of choice and manufacturing convenience within some limits. The innermost land should have the greatest number of grooves 40 in order to be assured that at least one such groove will be at or very close to a position directly under the lowest point on the shaft. This will assure substantially complete drainage of lubricant from the innermost radial groove. It is believed that the axially innermost land will require no fewer than eight axial grooves, but larger diameter rings will probably require a larger number of such grooves. Such complete drainage from the next outer radial grooves is not quite as important, so fewer axial grooves may be used in succeeding lands. It is important that there be some angular offset among the axial grooves from one land to another in order to avoid unimpeded outwardly directed fluid flow through a channel along the shaft. Thus, while some axially extending grooves 40 may be rotationally aligned between adjacent lands, it is essential that such alignment extend across no more than two such adjacent lands.

Referring again to FIG. 2, since outermost land 38 has no axially extending grooves, any fluid which reaches groove 30 will flow by gravity to the lowest portion of groove 30 and then move back toward the interior of the housing through the remaining axial and radial grooves mixing along the way with fluid from grooves 28 and 26.

In FIG. 6, there is shown another embodiment of the present invention in conbination with a complete isolator seal as described in the aforementioned U.S. Pat. No. 4,850,890. In this embodiment, labyrinth ring 114 includes as an integral part thereof, an end portion 115 which cooperates with rotor 112 and stator 110 to provide a fluid seal secondary to that of labyrinth ring 114. Labyrinth ring 114 functions in the same manner as ring 14 of FIGS. 1-5. Similarly, the pairs of O-rings 50 and 52 serve the same purposes as the single O-rings 50 and 52 of FIGS. 1-5.

Stator 110 and rotor 112 cooperate with one another to prevent contaminating fluids and/or solids from entering the bearing area. This cooperation is fully described in the aforesaid U.S. Pat. No. 4,852,890 and need not be repeated here. However, it should be noted that passages 121 have been extended through ring 114 to allow fluid to pass from cavity 123 back into the bearing area. Dotted lines 117 have been included in FIG. 6 to show how axial grooves 40 are preferred to be as deep as the radial groove to which they lead. FIG. 6 also shows clearly how each radial groove in bore 24 is preferably deeper than the next axially outer groove. For convenience of illustration only, dotted lines 117 are shown as being in alignment. In actual practice, there must be some offset as previously described.

Turning now to FIG. 7, there is shown a labyrinth ring 214 which may be installed in a bearing housing to seal fluid in the housing. O-ring 50 will hold the ring from rotation and again, the lands and grooves function in the manner previously described. Labyrinth rings of this type, i.e. without associated stator and rotor rings as in the previously described embodiments, will be particularly useful when there is little or no likelihood of contaminantion of the bearing lubricant by liquids or other foreign matter entering housing 16 from the exterior. Of course, suitable means must be provided to hold ring 214 in proper axial location in the housing bore.

Within the scope of the preceding description, numerous other variations are possible. As to materials, a preferred composition is carbon-filled PTFE. However, other compositions may be used, such as various plastic resins, elastomers, metals and composites. Properties that are most significant in making material choices are wear resistance, dimensional stability and chemical resistances. In each of the drawings, the radial grooves and the axial grooves have been shown as being square or rectangular in cross-section. However, other cross-sections such as hemispherical, V or slanted V may be used. The number of radial grooves may also vary depending upon the parameters of the particular application to be sealed. Thus, while it is believed that three grooves, and four lands, will be sufficient in most instances, there may be instances where four or five or more grooves will be desired. Also, it may be desired to have more than one outer land having no axially extending grooves. Thus, the preceding specification should be interpreted as examplary rather than as limiting and the scope of the invention is defined by the following claims.

I claim:

1. A labyrinth ring comprising
   (a) an axially inner end,
   (b) an axially outer end,
   (c) an internal bore,
   (d) a series of radial lands and grooves formed in said bore at said inner end,
   (e) a plurality of axial drainage grooves extending across said lands at spaced intervals around the inner periphery of said lands to join said radial grooves, said axial grooves in adjacent lands being rotationally offset from one another sufficiently that none of said axial grooves extends continuously across more than two adjacent radial lands, and
   (f) at least one radial land at said axially outer end having no axial grooves extending thereacross.

2. The ring of claim 1 wherein said plurality of axial grooves comprises at least eight across the axially innermost of said lands.

3. The ring claim 1 wherein said plurality of axial grooves across each outwardly succeeding land is no greater than the number of such grooves across the next inner land.

4. The ring of claim 1 wherein said at least one radial land at said axially outer end comprises a pair of radial lands and an intervening radial groove, neither of said lands having axial grooves extending thereacross.

5. The ring of claim 1 wherein said radial grooves decrease in depth progressively from said inner end toward said outer end.

6. The ring of claim 5 wherein said axial grooves are of a depth equal to that of the axially inner of the radial grooves joined thereby.

7. A ring of claim 1, said ring being integral with a portion of a stator element of a bearing isolator seal.

8. In a rotary shaft bearing isolator seal having a rotor disposed within a stator housing, said stator housing including an axially inner, radially inwardly extending flange, that improvement comprising an axially inwardly extending labyrinth ring depending from the radially inner portion of said flange, said labyrinth ring having
    (a) an axially inner end,
    (b) an axially outer end,
    (c) an internal bore,
    (d) a series of radial lands and grooves formed in said bore at said inner end,
    (e) a plurality of axial drainage grooves extending across said lands at spaced intervals around the inner periphery of said lands to join said radial grooves, said axial grooves in adjacent lands being rotationally offset from one another sufficiently that none of said axial grooves extends continuously across more than two adjacent radial lands, and
    (f) at least one radial land at said axially outer end having no axial grooves extending thereacross.

9. The ring of claim 8 wherein said plurality of axial grooves comprises at least eight across the axially innermost of said lands.

10. The ring of claim 8 wherein said plurality of axial grooves across each outwardly succeeding land is no greater than the number of such grooves across the next inner land.

11. The ring of claim 8 wherein said at least one radial land at said axially outer end comprises a pair of radial lands and an intervening radial groove, neither of said lands having axial grooves extending thereacross.

12. The ring of claim 8 wherein said radial grooves decrease in depth progressively from said inner end toward said outer end.

13. The ring of claim 12 wherein said axial grooves are of a depth equal to that of axially inner of the radial grooves joined thereby.

14. In combination, a labyrinth ring and a bearing isolator seal having a stator and a rotor, said labyrinth ring being integral with a portion of said stator and having
    (a) an axially inner end,
    (b) an axially outer end,
    (c) an internal bore,
    (d) a series of radial lands and grooves formed in said bore at said inner end,
    (e) a plurality of axial drainage grooves extending across said lands at spaced intervals around the inner periphery of said lands to join said radial grooves, said axial grooves in adjacent lands being rotationally offset from one another sufficiently that none of said axial grooves extends continuously across more than two adjacent radial lands, and
    (f) at least one radial land at said axially outer end having no axial grooves extending thereacross.

15. The ring of claim 14 wherein said plurality of axial grooves comprises at least eight across the axially innermost of said lands.

16. The ring of claim 14 wherein said plurality of axial grooves across each outwardly succeeding land is no greater than the number of such grooves across the next inner land.

17. The ring of claim 14 wherein said at least one radial land at said axially outer end comprises a pair of radial lands and an intervening radial groove, neither of said lands having axial grooves extending thereacross.

18. The ring of claim 14 wherein said radial grooves decrease in depth progressively from said inner end toward said outer end.

19. The ring of claim 18 wherein said axial grooves are of a depth equal to that of the axially inner of the radial grooves joined thereby.

* * * * *